Patented July 31, 1945

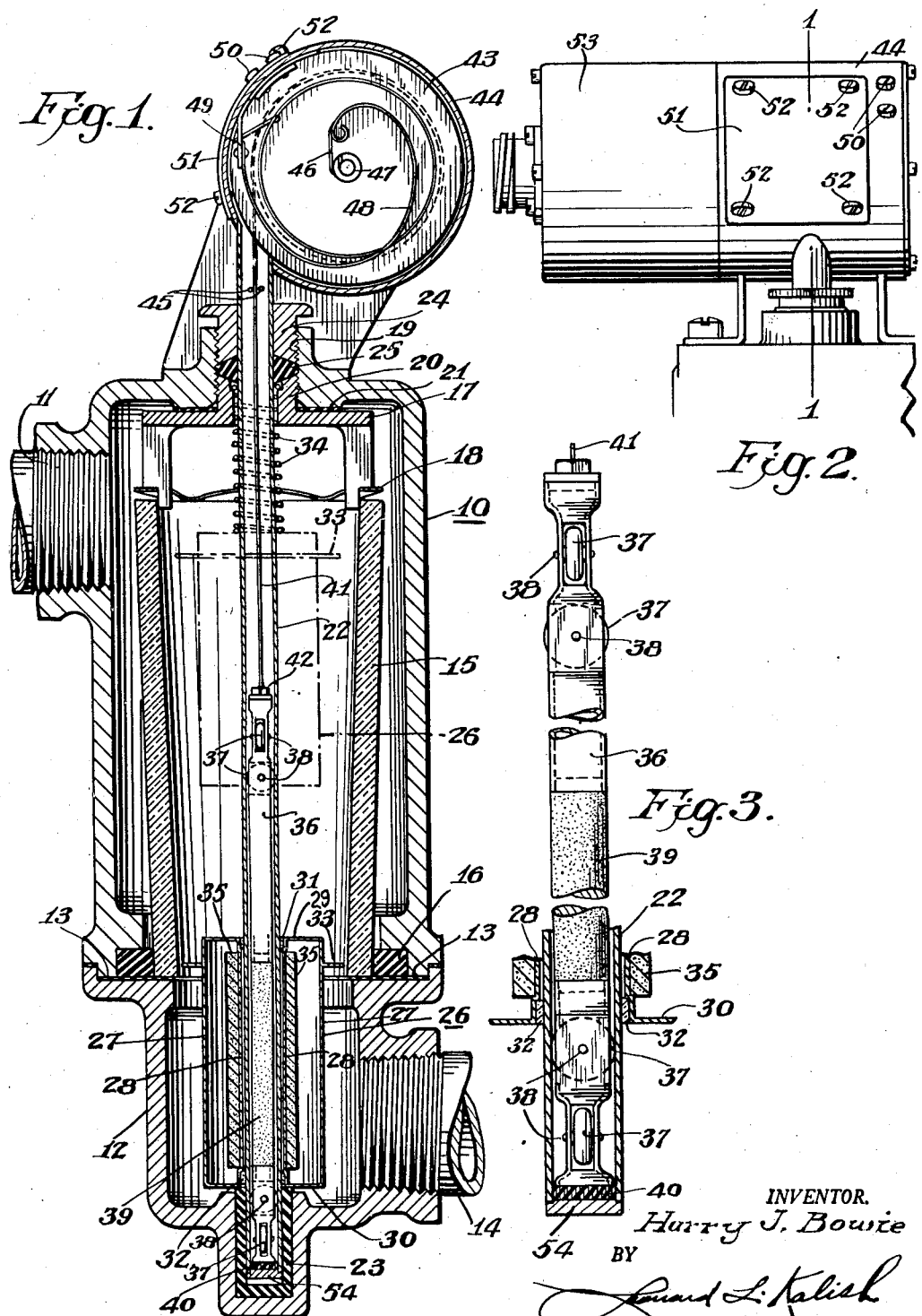

2,380,399

UNITED STATES PATENT OFFICE 2,380,399

FLOWMETER

Harry J. Bowie, Willow Grove, Pa., assignor to Fischer & Porter Company, Hatboro, Pa., a corporation of Pennsylvania Application June 10, 1943, Serial No. 490,234

7 Claims. (Cl. 73—209)

The present invention relates to flow meters for fluids and it relates more particularly to a certain new and useful remote indicating rotameter.

An object of the present invention is to provide a new and useful remote-indicating flow meter for fluids. Another object of the present invention is to provide a rotameter which measure rates-of-flow of fluid and will provide remote-indication thereof.

Other objects and advantages of the present invention are apparent in the following detailed description, appended claims and accompanying drawing.

For the purpose of illustrating the invention, there is shown in the accompanying drawing one form thereof which is at present preferred, since the same has been found in practice to give satisfactory and reliable results, although it is understood that the various instrumentalities of which the invention consists can be variously arranged and organized and that the invention is not limited to the precise arrangements and organizations of the instrumentalities as herein shown and described.

Referring to the accompanying drawing in which like reference characters indicate like parts throughout:

Figure 1 represents a vertical cross-sectional view of one embodiment of the present invention.

Figure 2 represents a fragmentary side elevational view of the embodiment of Figure 1.

Figure 3 represents a front elevational view, on an enlarged scale, of the follower magnet construction shown in Figure 1; parts being broken away better to reveal the construction thereof.

In the embodiment of Figures 1, 2, and 3, I may provide an outer case or jacket 10 which may be of metal or other suitable material having an outlet opening 11. A lower head 12 is connected to the case 10 by bolts (not shown); an intermediate gasket 13 providing a fluid-tight seal therebetween. The lower head 12 is provided with an inlet opening 14.

A tapered metering tube 15 of glass or other suitable material is disposed within the case 10; a gasket 16 being disposed in fluid-tight sealing relationship about the lower smaller end of said tapered tube 15.

The upper larger end of the tapered metering tube 15 terminates short of the upper end of said outer case 10; a centering spider 17 and a corrugated expander spring 18 contacting the upper end of said tapered metering tube 15 and holding it in position.

An internally screw-threaded neck 19 is provided at the upper end of said case 10; the spider 17 being detachably supported therefrom by a central-apertured externally screw-threaded portion 20. A gasket 21 provides a fluid-tight seal intermediate the spider 17 and the case 10.

A hollow tube 22, which may be of brass or any other suitable non-magnetic material, passes downwardly through the neck 19 along the axis of the tapered tube 15 and is supported, at its lower end, within a cup-shaped "neoprene" support 23 set in the lower end of the head 12. An apertured externally screw-threaded plug 24 is disposed within the upper end of the neck 19 and is adapted to compress a sealing gasket 25 to provide a fluid-tight seal intermediate the tube 22 and the neck 19.

A float of non-magnetic material designated generally by the reference character 26 is slidably mounted upon the tube 22 for free up-and-down movement therealong.

The float 26 is preferably constructed as a hollow cylindrical member having an outer cylinder wall 27 and an inner cylindrical wall 28 connected by an upper end cover 29 and a lower end cover 30. Upper and lower bushings 31 and 32, which may be of glass or other suitable material, are provided intermediate the tube 22 and the inner cylindrical wall 28 of the float 26; the bushings 31 and 32 permitting free movement of the float 26 along the tube 22.

An annular outwardly-extending head portion 33 is provided at the upper end of said float 26; a very slight annular clearance being provided intermediate the periphery of said head portion 33 and the inner wall of said tapered tube 15 when the float 26 is in its lowermost position shown in solid lines in Figure 1, the annular clearance intermediate the head portion 33 and the inner wall of said tapered metering tube 15 increasing as the float 26 moves upwardly within tube 15 as shown in dotted lines in Figure 1.

A spiral spring 34 is disposed about the upper end of said tube 22 and provides an upper stop for the float 26.

A pair of bar magnets 35 are diametrically disposed within the hollow float 26 adjacent the inner cylindrical wall 28 thereof.

An inner follower tube 36 of brass or other non-magnetic material is slidably mounted within the tube 22 by upper and lower pairs of oppositely-extending wheels 37 mounted on pins 38 extending through slotted oppositely flattened portions of said inner tube 36. A follower magnet 39 is disposed within the lower end of said inner tube 36; the follower magnet 39 being intermediate the diametrically opposed magnets 35 in the float 26 and being generally the same length as said magnets 35 but having its north and south poles reversed relative thereto.

A "neoprene" bumper 40 is disposed within the lowermost end of the tube 22 and serves as a bottom stop for said inner tube 36. A plug 54 closes the lower end of the tube 22.

A metal ribbon support 41 is attached to the upper end of the inner tube 36 by the ribbon clamp 42 and extends upwardly therefrom through the tube 22; the upper end of said ribbon 41 being attached to a sheave wheel 43 mounted within a case 44 disposed above the case or jacket 10. A U-shaped wire or cotter pin 45 passes through the tube 22 above the neck 19 and serves as a guide for the metal ribbon 41.

A metal ribbon 46 connects the hub 47 of the sheave wheel 43 to one end of a spiral spring 48 whose other end is attached to a spring clip 49 which is fastened to the case 44 by a pair of bolts 50. The spring 48 tends to rotate the sheave wheel 43 in a clock-wise direction in Figure 1 thereby tending to wind up the ribbon 41 and to counterbalance the weight of the inner tube 36 and the follower magnet 39.

The case 44 is provided with a hatch or cover 51 which is detachably secured thereto by bolts 52.

The operation of the present construction will now be described.

The float 26 has a negative buoyancy with respect to the fluid to be metered so that, when there is no upward flow of fluid through the tapered metering tube 15, the float 26 remains in its lowermost position as shown in solid lines in Figure 1. When, however, fluid begins to flow upwardly through the metering tube 15, it tends to raise the float 26 therein. The height to which the float 26 is lifted within the tapered metering tube 15 is a direct indication of the rate-of-flow of the fluid; the flow-constricting head portion 33 of said float 26 cooperating with the tapered inner wall of the metering tube 15 to give a variable metering orifice, the principle of which is well known and conventional.

As the float 26 moves upwardly within the tapered metering tube 15, the magnetic couple between the magnets 35 therein and the follower magnet 39, tends to lift the inner tube 36 along with the float 26. As the inner tube 36 is lifted, the ribbon 41 is wound up upon the sheave wheel 43 which is rotated clock-wise by the spiral spring 48; the rotation of the sheave wheel 43 corresponding to the upward movement of the float 26.

The hub 47 of the sheave wheel 43 is keyed to an electrical transmitter 53 of the conventional construction which is adapted to be connected with a remote synchronized receiving and indicating unit (not shown), the reading of which will indicate the rate-of-flow of fluid. One conventional form of electrical transmitter which may be used at 53 is that shown in U. S. Patent 2,038,059, issued April 21, 1936, to W. A. Reichel et al.

It can be seen that the fluid leaving the upper end of the tapered metering tube 15 escapes into the outer case 10, surrounding the metering tube before leaving through the outlet opening 11. In this way, the pressure inside and outside the relatively frangible metering tube 15 is equalized so as to permit the use of the flow meter at relatively high fluid pressures.

The novel construction of the present invention provides accurate and dependable remote indication of rate-of-flow. The construction of the present invention is particularly well adapted for determination of the rate-of-flow of fuel in an aircraft or the like.

The present invention may be embodied in other specific forms without departing from the spirit or essential attributes thereof, and it is therefore desired that the present embodiment be considered in all respects as illustrative and not restrictive, reference being had to the appended claims rather than to the foregoing description to indicate the scope of the invention.

Having thus described my invention, what I claim as new and desire to protect by Letters Patent is:

1. A flow-meter for remote indication of rate-of-flow of fluids comprising a vertical downwardly-tapered metering tube, a guide tube of non-magnetic material disposed along the axis of said tapered tube, a metering float slidably mounted outside said guide tube and adapted for free up-and-down movement within said tapered tube, responsive to the rate-of-flow of fluid upwardly therethrough, said float having a magnet disposed therewithin, a follower magnet movably mounted within said guide tube whereby said follower magnet is carried axially within said guide tube by the flow-responsive up-and-down movement of said float, means for counterweighting said follower magnet, and means associated with said follower magnet for translating and transmitting the flow-actuated movement of said follower magnet.

2. A flow-meter for remote indication of rate-of-flow of fluids comprising a vertical metering chamber having axially varying cross-sectional area with the smallest cross-sectional area at the bottom, said metering chamber being adapted for upward flow of fluid therethrough, a guide tube extending upwardly along the center of said metering chamber, a metering float movably mounted upon said guide tube and adapted for free up-and-down movement within said metering chamber responsive to the rate-of-flow of fluid therethrough, said float having a magnet disposed therewithin, a follower magnet movably mounted within said guide tube and adapted to follow the up-and-down movement of said float, and means associated with said follower magnet for translating and transmitting the movement of said follower magnet.

3. A flow-meter for remote indication of rate-of-flow of fluids comprising a vertical metering chamber of upwardly-increasing cross-sectional area adapted for upward flow of fluid therethrough, a guide tube extending vertically along the center of said metering chamber, a metering float movably mounted upon said guide tube and adapted for free up-and-down movement within said metering chamber responsive to the rate-of-flow of fluid therethrough, a follower movably mounted within said guide tube, means providing a magnetic couple between said float and said follower whereby said follower will follow the up-and-down movement of said float, and means associated with said follower for translating and transmitting the movement of said follower.

4. A flow-meter for remote indication of rate-of-flow of fluids comprising a vertical metering chamber of upwardly-increasing cross-sectional area adapted for upward flow of fluid therethrough, a guide tube extending vertically along the center of said metering chamber, a metering float movably mounted upon said guide tube and adapted for free up-and-down movement within said metering chamber responsive to the rate-of-flow of fluid therethrough, a follower movably mounted within said guide tube, means providing a magnetic couple between said float and said follower whereby said follower will follow the up-and-down movement of said float, a counterweighting spring-tension wind-up wheel mounted above said guide tube, flexible supporting means connecting said follower to said wheel whereby the up-and-down movement of said follower is translated to rotary movement of said wheel, and means connected to said wheel for electrically transmitting the rotary movement thereof.

5. A flow-meter for remote indication of rate-of-flow of fluids comprising an outer case of metal, having an inlet opening and an outlet opening, a vertical downwardly-tapering metering tube disposed within said outer case and adapted for upward flow of fluid therethrough, a guide tube disposed along the axis of said tapered tube and extending upwardly beyond said outer case, a metering float movably mounted upon said guide tube and adapted for free up-and-down movement within said tapered metering tube responsive to the rate-of-flow of fluid therethrough, said float having a magnet disposed therewithin, a follower magnet movably mounted within said guide tube and adapted to follow the up-and-down movement of said float, a counterweighting spring-tensioned wheel mounted above said outer case, a flexible support extending upwardly from said follower magnet through said guide tube, said flexible support being connected at its upper end to said wheel whereby the up-and-down movement of said follower magnet is translated to rotary movement of said wheel, and means connected to said wheel for electrically transmitting the rotary movement thereof.

6. A flow-meter for remote indication of rate-of-flow of fluids comprising an outer case of metal, having an inlet opening and an outlet opening, a vertical relatively frangible downwardly tapered metering tube disposed within said outer case and adapted for upward flow of fluid therethrough, the upper end of said metering tube opening into said outer case whereby the fluid pressure is generally the same outside and inside of said relatively frangible metering tube, a guide tube disposed along the axis of said tapered tube and extending upwardly beyond said outer case, a metering float movably mounted upon said guide tube and adapted for free up-and-down movement within said tapered metering tube responsive to the rate-of-flow of fluid therethrough, said float having a magnet disposed therewithin, a follower magnet movably mounted within said guide tube and adapted to follow the up-and-down movement of said float, a counterweighting spring-tensioned wheel mounted above said outer case, a flexible support extending upwardly from said follower magnet through said guide tube, said flexible support being connected at its upper end to said wheel whereby the up-and-down movement of said follower magnet is translated to rotary movement of said wheel, and means connected to said wheel for electrically transmitting the rotary movement thereof.

7. A flow-meter for remote indication of rate-of-flow of fluids comprising a vertical metering chamber of upward-increasing cross-sectional area adapted for upward flow of fluid therethrough, a guide tube extending vertically along the center of said metering chamber, a hollow metering float movably mounted upon said guide tube and adapted for free up-and-down movement within said metering chamber responsive to the rate-of-flow of fluid therethrough, a pair of magnets diametrically disposed within said metering float, a follower magnet movably mounted within said guide tube generally intermediate the diametrically disposed magnets within said metering float, said follower magnet having its north and south poles reversed relative to the poles of the magnets within said float thereby to provide a magnetic couple therewith and to cause said follower magnet to follow the up-and-down movement of said float, means for counterweighting said follower magnet, and means associated with said follower magnet for translating and transmitting the movement of said follower magnet.

HARRY J. BOWIE.